United States Patent
Yohanan et al.

(10) Patent No.: US 10,374,542 B2
(45) Date of Patent: Aug. 6, 2019

(54) ELECTRIC SUBMERSIBLE PUMP VARIABLE SPEED DRIVE CONTROLLER

(71) Applicant: Summit ESP, LLC, Tulsa, OK (US)

(72) Inventors: Tom G. Yohanan, Broken Arrow, OK (US); Ryan Bridwell Ashbaugh, Broken Arrow, OK (US); John Vanderstaay Kenner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/955,864

(22) Filed: Apr. 18, 2018

(65) Prior Publication Data

US 2018/0234044 A1 Aug. 16, 2018

Related U.S. Application Data

(63) Continuation of application No. 15/493,490, filed on Apr. 21, 2017, now Pat. No. 9,998,054.

(60) Provisional application No. 62/325,897, filed on Apr. 21, 2016.

(51) Int. Cl.
| | |
|---|---|
| *H02P 7/29* | (2016.01) |
| *H02P 7/06* | (2006.01) |
| *H02P 27/04* | (2016.01) |
| *H02K 17/16* | (2006.01) |
| *H02M 7/00* | (2006.01) |
| *H02M 5/458* | (2006.01) |

(52) U.S. Cl.
CPC ............ *H02P 27/047* (2013.01); *H02K 17/16* (2013.01); *H02M 5/458* (2013.01); *H02M 5/4585* (2013.01); *H02M 7/00* (2013.01)

(58) Field of Classification Search
USPC .......................... 318/599–603, 611, 619–623
See application file for complete search history.

(56) References Cited

U.S. PATENT DOCUMENTS

| | | | | |
|---|---|---|---|---|
| 4,651,079 A | * | 3/1987 | Wills ...................... | H02P 25/04 318/749 |
| 5,239,251 A | * | 8/1993 | Lauw ...................... | H02P 6/005 290/31 |
| 5,243,154 A | * | 9/1993 | Tomisawa ................. | B66B 1/24 187/286 |
| 5,868,175 A | * | 2/1999 | Duff ..................... | B67D 7/0486 141/192 |

(Continued)

Primary Examiner — Bentsu Ro
(74) Attorney, Agent, or Firm — Gilliam IP PLLC

(57) ABSTRACT

An electric submersible pump (ESP) variable speed drive (VSD) controller is described. A VSD control system includes a pump assembly including an induction motor operatively coupled to a pump, a power cable and a transformer electrically coupled between the induction motor and a VSD controller that controls a speed of the induction motor, the VSD controller including a converter section that sends a direct current (DC), a DC link including a DC smoothing capacitor that smooths the DC, an inverter that converts the smoothed DC to a pulse width modulated (PWM) output voltage, the inverter including at least one silicon carbide (SiC) power semiconductor module, and a PWM filter that filters the PWM output voltage to produce near sinusoidal voltages, the PWM filter including inductors, and the PWM filter sending voltage to the transformer.

17 Claims, 7 Drawing Sheets

(56) References Cited

U.S. PATENT DOCUMENTS

2003/0058662 A1\* 3/2003 Baudelot ............. H02M 5/4585
  363/37
2007/0024229 A1\* 2/2007 Caro ........................ F24F 11/77
  318/727

\* cited by examiner

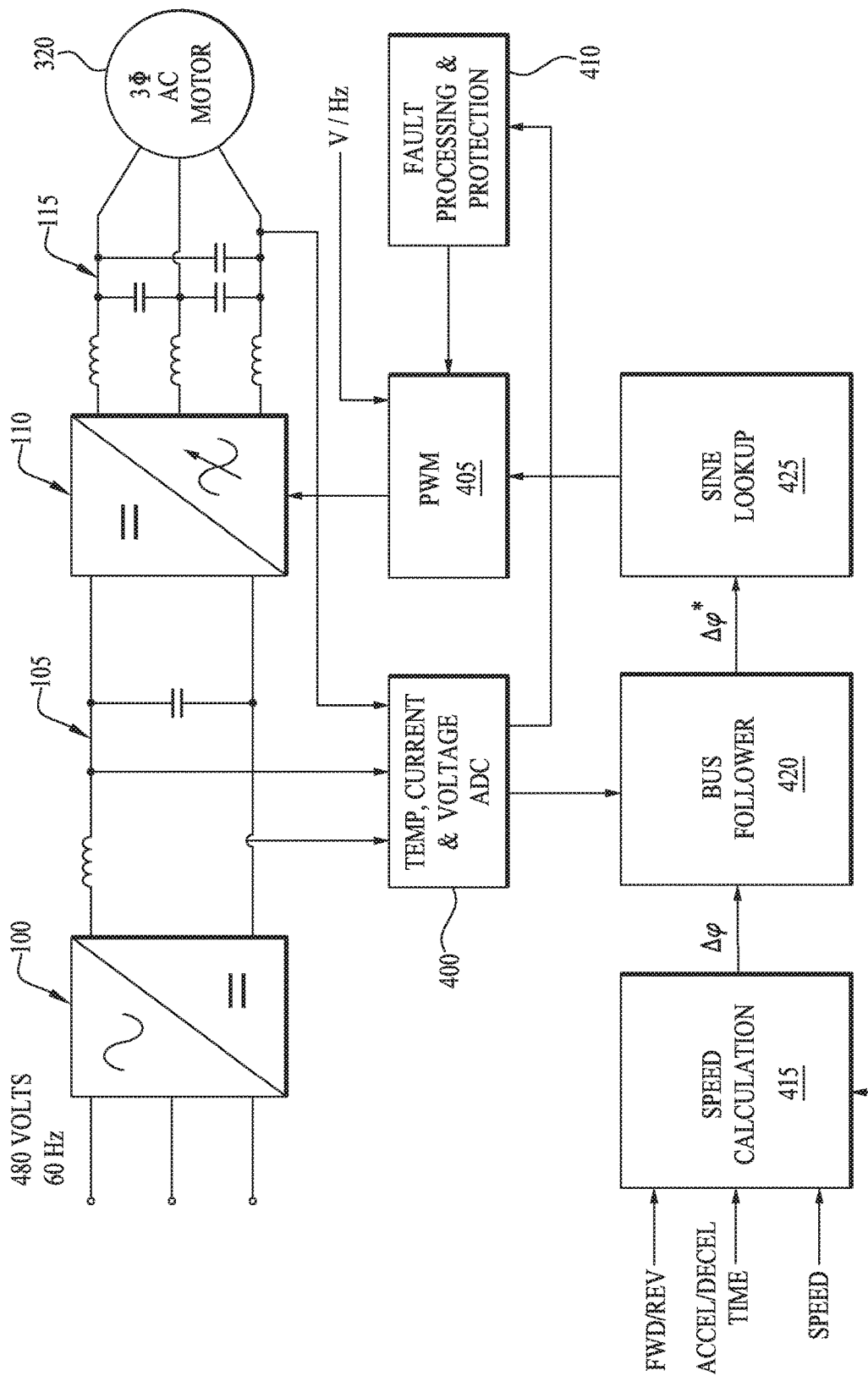

ELECTRIC SUBMERSIBLE PUMP VARIABLE SPEED DRIVE CONTROLLER

CROSS REFERENCE TO RELATED APPLICATIONS

The present application is a continuation of application Ser. No. 15/493,490 to Yohanan et al., filed Apr. 21, 2017 and entitled ELECTRIC SUBMERSIBLE PUMP VARIABLE SPEED DRIVE CONTROLLER, which claims the benefit of U.S. Provisional Application No. 62/325,897 to Yohanan et al., filed Apr. 21, 2016 and entitled "ELECTRIC SUBMERSIBLE PUMP POWER SYSTEM," each of which are hereby incorporated by reference in their entireties.

BACKGROUND OF THE INVENTION

1. Field of the Invention

Embodiments of the invention described herein pertain to the field of electric submersible pump (ESP) assemblies. More particularly, but not by way of limitation, one or more embodiments of the invention enable an ESP variable speed drive controller.

2. Description of the Related Art

Submersible pump assemblies are used to artificially lift fluid from underground formations, such as oil, natural gas and/or water wells, to the surface. These wells are typically thousands of feet deep, with the pump assembly placed inside the deep well. A typical electric submersible pump (ESP) assembly consists, from bottom to top, of an electric motor, seal section, pump intake and centrifugal pump, which are all connected together with shafts. The electric motor supplies torque to the shafts, which provides power to the centrifugal pump. The electric motor is generally a two-pole, three-phase, squirrel cage induction design connected by a power cable to a power source located at the surface of the well. The power cable includes a motor lead assembly and downhole cable, and extends from the downhole motor deep within the well, to a transformer connected to a power generating system at the surface of the well. These ESP power cables are typically between about 4,000 to 12,000 feet in length, depending on well depth, since the cable must extend from deep within the well to the surface where the power source is located.

The ESP power generating system typically includes a variable speed drive (VSD) that is connected to an electrical grid. The VSD is located at the surface of a well that employs the ESP assembly. The VSD, also sometimes called a variable-frequency drive, adjustable frequency drive, AC drive, micro drive or inverter drive, is an adjustable speed drive used to control the speed and torque of the ESP induction motor by varying motor input frequency and voltage. A VSD system may comprise three main subsystems: the AC motor that is the ESP three-phase induction motor, the main drive controller assembly and the drive user-interface. The controller is commonly a solid-state power electronics conversion system. An embedded microprocessor control system such as a VSD controller is generally implemented as firmware and may govern the overall operation of the VSD.

The VSD solid-state power electronics conversion system for ESP assemblies typically consists of four distinct subsystems: a converter section, a direct current (DC) link, an inverter section and a pulse width modulated (PWM) filter. The typical converter section consists of a three-phase, six-pulse, full-wave diode bridge. The DC link consists of a capacitor which smooths out the converter's DC output ripple and provides a stiff input to the inverter. This filtered DC voltage is converted to PWM output voltage using the inverter's active switching elements. These PWM signals are filtered by the PWM filter section to obtain near sinusoidal voltages. PWM filters currently require large steel inductors. Current inverter sections operate at low switching frequencies, and the lower the frequency, the more steel is required for the inductor. Large steel inductors are the primary contributor to the large footprint of conventional VSD controllers.

Current implementation of the inverter section is realized using silicon (Si) power semiconductor devices. However, silicon power semiconductor devices are limited in their operating temperatures, current density and blocking voltages. These limitations lead to operational inefficiencies in conventional VSDs operating ESP motors, such as high switching losses, in addition to the aforementioned large footprints. A conventional VSD with a Si power semiconductor device is only 97% efficient without a PWM filter. Thus, up to three-percent of power sent to the VSD controller dissipates and is and not available to the ESP motor. Three-percent dissipation represents a significant loss in a 500 kVA drive. There is an inverse relationship between switching frequency and the footprint of the magnetics.

High switching losses and large footprints are particularly problematic in offshore ESP applications. In offshore applications, the VSD controller must fit on a floating unit where space is at a premium and must be used efficiently in order to lift and collect hydrocarbons in the middle of the ocean.

As is apparent from the above, current VSD controllers undesirably limit operation of ESP assemblies. Therefore, there is a need for an improved ESP VSD controller.

BRIEF SUMMARY OF THE INVENTION

One or more embodiments of the invention enable an electric submersible pump (ESP) variable speed drive (VSD) controller.

An ESP VSD controller is described. An illustrative embodiment of an electric submersible pump (ESP) variable speed drive (VSD) control system includes an ESP assembly including a two-pole, three-phase squirrel cage induction motor operatively coupled to a multi-stage centrifugal pump, an ESP power cable and a transformer electrically coupled between the two-pole, three-phase squirrel cage induction motor and a VSD controller, the VSD controller controlling a speed of the two-pole, three-phase squirrel cage induction motor, the VSD controller including a converter section that sends a direct current, a DC link including a DC smoothing capacitor that smooths the direct current, an inverter active switch section that converts the smoothed direct current to a pulse width modulated (PWM) output voltage, the inverter active switch section including at least one silicon carbide (SiC) power semiconductor module, each of the at least one SiC power semiconductor modules including a pair of SiC MOSFETs, wherein a first SiC MOSFET of the pair of SiC MOSFETs is electrically connected to a second SiC MOSFET of the pair of SiC MOSFETs by a terminal, the terminal serving as a drain of the first SiC MOSFET and a source of the second MOSFET, a voltage switch, and a feedback line, a PWM filter that filters the PWM output voltage to produce near sinusoidal voltages, the PWM filter including a plurality of inductors, and the PWM filter sending voltage to the transformer. In some embodiments, the converter section includes a three-phase, six-pulse, full-wave diode bridge. In certain embodiments, the VSD controller includes an LCL input filter and the converter section includes an active front end, the active front end including a second at least one SiC power semiconductor module, each of the second at least one SiC power semiconductor modules including a second pair of SiC MOSFETs, wherein a first SiC MOSFET of the second pair of SiC MOSFETs is electrically connected to a second SiC MOSFET of the second pair of SiC MOSFETs by a second terminal, the second terminal serving as a drain of the first SiC MOSFET of the second pair of SiC MOSFETs and a source of the second MOSFET of the second pair of SiC MOSFETs, a second voltage switch, and a second feedback line. In some embodiments, the ESP VSD control system further including an offshore platform above a well, wherein the ESP assembly is downhole in the well, the VSD controller is on the offshore platform, and wherein the ESP power cable extends between the VSD controller and the ESP assembly. In certain embodiments, the inverter active switch section includes three SiC power semiconductor modules, each module packaged in a housing and including a heat sink baseplate. In some embodiments, each of the at least one SiC power semiconductor modules includes a plurality of the pairs of SiC MOSFETs.

An illustrative embodiment of an electric submersible pump (ESP) variable speed drive (VSD) control system includes an ESP assembly including a two-pole, three-phase squirrel cage induction motor operatively coupled to a multi-stage centrifugal pump, an ESP power cable and a transformer electrically coupled between the two-pole, three-phase squirrel cage induction motor and a VSD controller, the VSD controller controlling a speed of the two-pole, three-phase squirrel cage induction motor, the VSD controller including a converter section that sends a direct current, a DC link including a DC smoothing capacitor that smooths the direct current, an inverter active switch section that converts the smoothed direct current to a pulse width modulated (PWM) output voltage, the inverter active switch section including at least one silicon carbide (SiC) power semiconductor module, each of the at least one SiC power semiconductor modules including a pair of SiC IGBT devices, wherein a first SiC IGBT device of the pair of SiC IGBT devices is electrically connected to a second SiC IGBT device of the pair of SiC IGBT devices by a terminal, the terminal serving as a drain of the first SiC IGBT device and a source of the second IGBT device, a voltage switch, and a feedback line, a PWM filter that filters the PWM output voltage to produce near sinusoidal voltages, the PWM filter including a plurality of inductors, and the PWM filter sending voltage to the transformer. In some embodiments, the converter section includes a three-phase, six-pulse, full-wave diode bridge. In certain embodiments, the VSD controller includes an LCL input filter and the converter section includes an active front end, the active front end including a second at least one SiC power semiconductor module, each of the second at least one SiC power semiconductor modules including a second pair of SiC IGBT devices, wherein a first SiC IGBT device of the second pair of SiC IGBT devices is electrically connected to a second SiC IGBT device of the second pair of SiC IGBT devices by a second terminal, the second terminal serving as a drain of the first SiC IGBT device of the second pair of SiC IGBT devices and a source of the second IGBT device of the second pair of SiC IGBT devices, a second voltage switch, and a second feedback line. In some embodiments, the ESP VSD control system further includes an offshore platform above a well, wherein the ESP assembly is downhole in the well, the VSD controller is on the offshore platform, and wherein the ESP power cable extends between the VSD controller and the ESP assembly. In certain embodiments, the inverter active switch section includes three SiC power semiconductor modules, each module packaged in a housing and including a heat sink baseplate. In some embodiments, each of the at least one SiC power semiconductor modules includes a plurality of the pairs of SiC IGBT devices.

An illustrative embodiment of a variable speed drive (VSD) control system includes a pump assembly including an induction motor operatively coupled to a pump, a power cable and a transformer electrically coupled between the induction motor and a VSD controller, the VSD controller controlling a speed of the induction motor, the VSD controller including a converter section that sends a direct current, the DC link including a DC smoothing capacitor that smooths the direct current, an inverter active switch section that converts the smoothed direct current to a pulse width modulated (PWM) output voltage, the inverter active switch section including at least one silicon carbide (SiC) power semiconductor module, and a PWM filter that filters the PWM output voltage to produce near sinusoidal voltages, the PWM filter including a plurality of inductors, and the PWM filter sending voltage to the transformer. In some embodiments, each of the at least one SiC power semiconductor modules includes a SiC MOSFET. In certain embodiments, each of the at least one SiC power semiconductor modules includes at least one pair of SiC MOSFETs. In some embodiments, each of the at least one SiC power semiconductor modules includes a SiC IGBT device. In certain embodiments, each of the at least one SiC power semiconductor modules includes at least one pair of SiC IGBT devices. In some embodiments, the converter section includes a plurality of second SiC power semiconductor modules, each of the plurality of second SiC power semiconductor modules including at least one pair of SiC MOSFETs. In certain embodiments, the converter section includes a plurality of second SiC power semiconductor modules, each of the plurality of second SiC power semiconductor modules including at least one a pair of SiC IGBT devices. In some embodiments, the pump is a multi-stage centrifugal surface pump. In certain embodiments, the pump is a progressive cavity pump.

In further embodiments, features from one embodiment may be combined with features from any of the other embodiments. In further embodiments, additional features may be added to the specific embodiments described herein.

BRIEF DESCRIPTION OF THE DRAWINGS

The above and other aspects, features and advantages of illustrative embodiments of the invention will be more apparent from the following more particular description thereof, presented in conjunction with the following drawings wherein:

FIG. 4 is a schematic diagram of an illustrative embodiment of a VSD control section.

Figure 1:
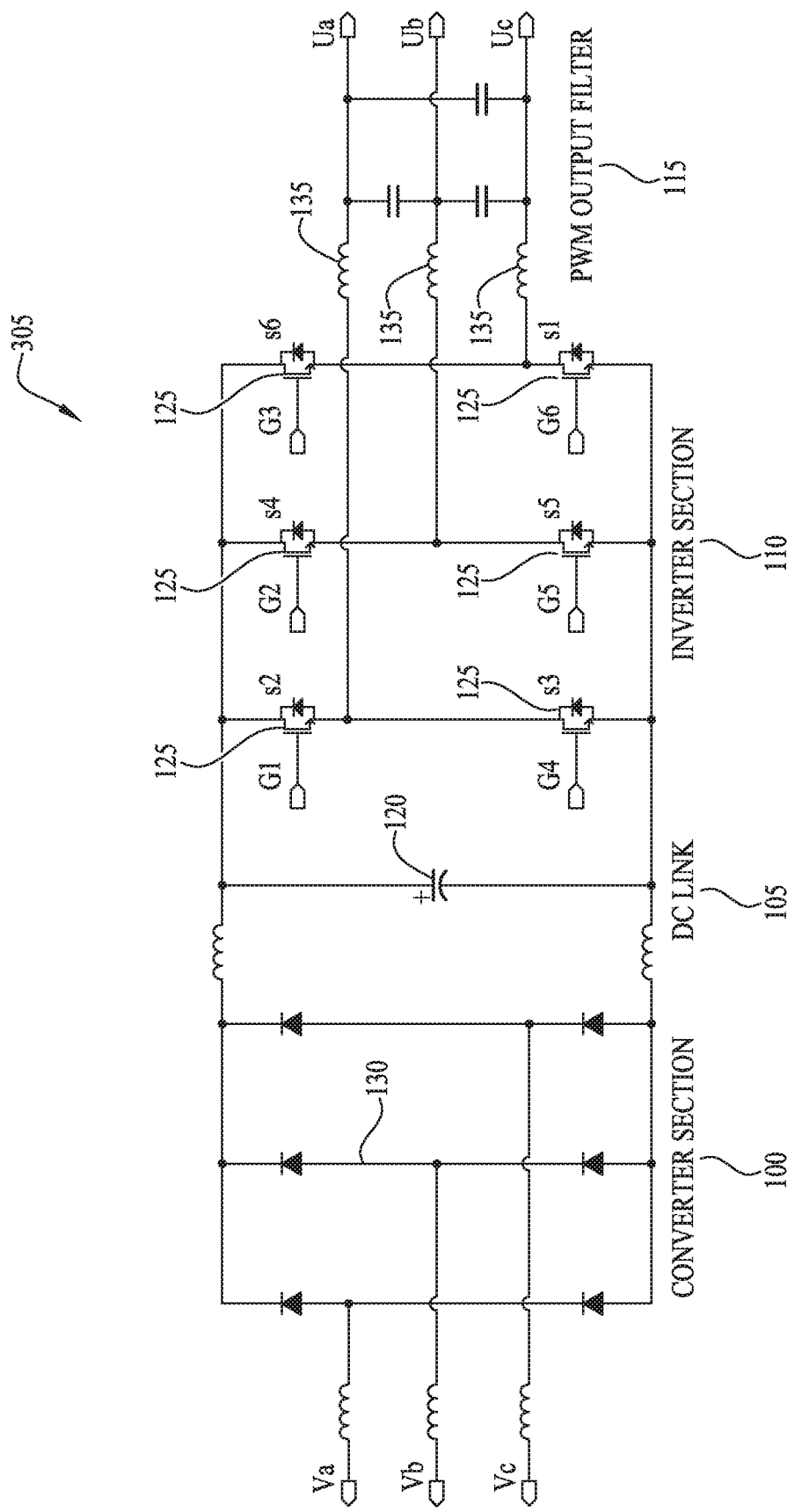
FIG. 1 is a schematic of an exemplary variable speed drive (VSD) controller with an inverter section of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives to such embodiments that fall within the scope of the present invention as defined by the appended claims.

DETAILED DESCRIPTION

An electric submersible pump (ESP) variable speed drive (VSD) controller will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a power device includes one or more power devices.

"Coupled" refers to either a direct connection or an indirect connection (e.g., at least one intervening connection) between one or more objects or components. The phrase "directly attached" means a direct connection between objects or components.

For ease of description and so as not to obscure the invention, illustrative embodiments are described in terms of a downhole ESP pump assembly. However, illustrative embodiments are not so limited and may be employed where it is desirable to decrease power loss, increase switching frequency and decrease footprint of a VSD, for example in VSD controllers for horizontal surface pumps operated by induction motors that may employ multi-stage centrifugal pumps, progressive cavity pumps employing a surface motor, and/or for electric submersible progressive cavity pumps employing a downhole ESP motor.

Illustrative embodiments provide a VSD controller for an ESP induction motor that employs one or more silicon carbide power semiconductor devices. The silicon carbide power semiconductor device of illustrative embodiments replaces the conventional silicon power semiconductor devices typically used in VSD inverters employed in ESP assemblies. The VSD controller of illustrative embodiments may increase VSD efficiency to 98% efficiency, measured as the power out to the ESP motor versus the power into the drive. For ESP drives 98% efficiency is a significant improvement over the conventional 97% efficiency. Illustrative embodiments may minimize switching losses, run at a higher switching frequency, and produce more power in a smaller footprint than conventional silicon power devices employed in VSD inverters for ESPs. Silicon-based inverters for drives operating ESP motors conventionally run at a switching frequency less than 5 kHz. In contrast, illustrative embodiments may provide an ESP main drive controller with a switching frequency greater than 20 kHz. The VSD of illustrative embodiments may have a smaller footprint and lower cost than conventional VSDs for ESP assemblies at the same power output. The smaller footprint may be accomplished as a result of the increased switching frequency of illustrative embodiments. The increased frequency may permit as much as a 10-35% decrease in the size of the PWM filter inductor footprint, the inductors being a primary contributor to footprint size.

Figure 2:
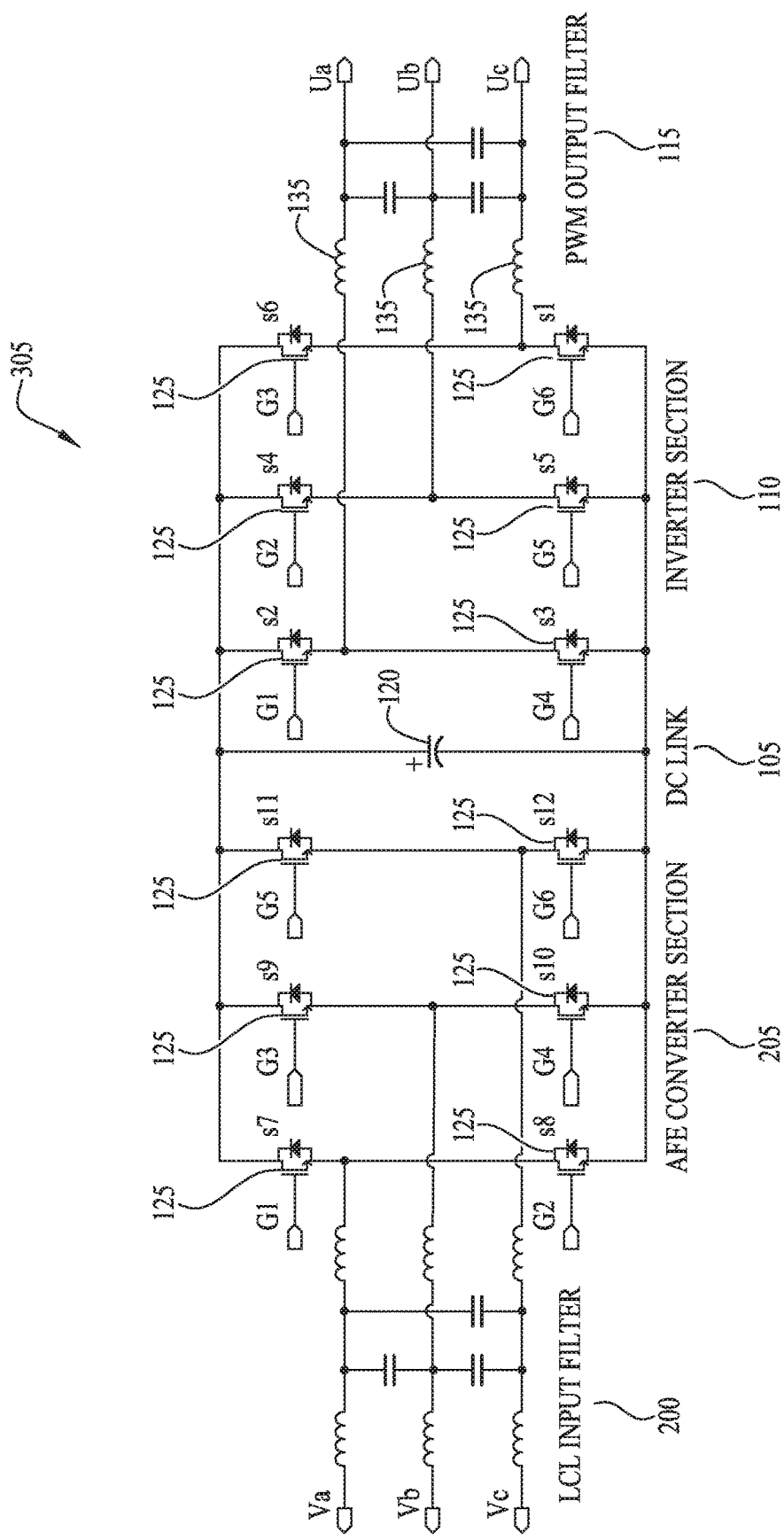
FIG. 2 is a schematic of an exemplary VSD controller of an illustrative embodiment having an active front end converter section and inverter section of an illustrative embodiment.

FIG. 1 and FIG. 2 show block diagrams of illustrative embodiments of a variable speed drive controller that has a power output of between fifty horsepower (hp) and 3,000 hp, which may be the power requirement for an exemplary ESP motor. VSD controller 305 may be a 500 kVA drive and include diode bridge converter section 100, DC link 105, inverter section 110 and PWM filter section 115 sub-systems. In some embodiments, diode bridge converter section 100 may include three-phase, six-pulse, full-wave diode bridge 130, as shown in FIG. 1. In some embodiments, as shown in FIG. 2, diode bridge converter section 100 may be replaced with active front end (AFE) converter 205. AFE converter 205 may draw current sinusoidally to assist in reducing harmonics as compared to the embodiment of diode bridge converter section 100 of FIG. 1. In AFE 205 embodiments, one or more silicon carbide (SiC) power semiconductor devices 125 may be employed in AFE 205. As shown in FIG. 2, six SiC power devices 125 may be included in AFE 205. Also as shown in FIG. 2, LCL input filter 200 may be employed in AFE converter 205 embodiments. In the embodiments of FIG. 1 and FIG. 2, DC link 105 may include capacitor 120 which may smooth out the DC output ripple of converter 100 or AFE converter 205 and provides a stiff input to inverter section 110. As illustrated, inverter section 110 may include six SiC power devices 125, although the number of SiC power devices 125 may be modified based on system requirements. The filtered DC voltage may be converted to PWM output voltage using the active switching elements of SiC power devices 125 of inverter section 110. These PWM signals may be filtered by PWM filter section 115 to obtain near sinusoidal voltages. PWM filter section 115 may include inductors 135.

FIG. 4 shows a block diagram of the control section of a firmware implementation of an illustrative embodiment. Since speed sensing is not an option for ESP motor 320 thousands of feet underground, and precise positioning and speed control is not necessary, a simple volt per hertz implementation may be employed in ESP embodiments. ESP motor 320 may be an AC, two-pole, three-phase squirrel cage induction motor operating to turn a multistage centrifugal pump. The speed of ESP motor 320 is a function of frequency, and the speed of ESP motor 320 should be adjusted to match well productivity. If ESP motor 320 speed is not properly adjusted, motor 320 may overheat due to a lack of cool fluid flowing by during operation. Temperature and current feedback are sensed in transducer 400 for fault detection and shutdown. Bus voltage feedback, which is also sensed in transducer 400, is used for bus follower algorithm 420. Offset into the sine lookup table 425 is calculated in speed calculator 415 based on the acceleration/deceleration time setting, demanded speed, direction of rotation of ESP motor 320, and whether ESP motor 320 is ramping or in steady state condition. There may be three offsets (120 degrees apart). This offset may be augmented if the bus voltage is pumped up during fault condition of a large inertia load by bus follower algorithm 420. PWM waveform generator 405 then may generate the PWM output based on the output from sine lookup 425 and the V/Hz setting. Fault processor 410 may modify the PWM to limit the current or completely shut down the output as needed.

Power devices 125 may comprise, constitute and/or include SiC power semiconductor devices, rather than conventional silicon power semiconductor devices. To date, although SiC power devices provide high switching frequencies and low losses, SiC power devices have not been successfully employed in ESP VSD controller systems due to unique system requirements and constraints facing the ESP industry. VSD controller 305 may be required to power and control motor 320 thousands of feet below the surface of the ground in harsh downhole environments, where ambient conditions may be unknown. Speed of motor 320 must be continuously and remotely monitored and adjusted based on well productivity, fluid composition and ambient conditions to prevent motor overheating and/or failure, without the benefit of speed sensing.

Figure 5A:
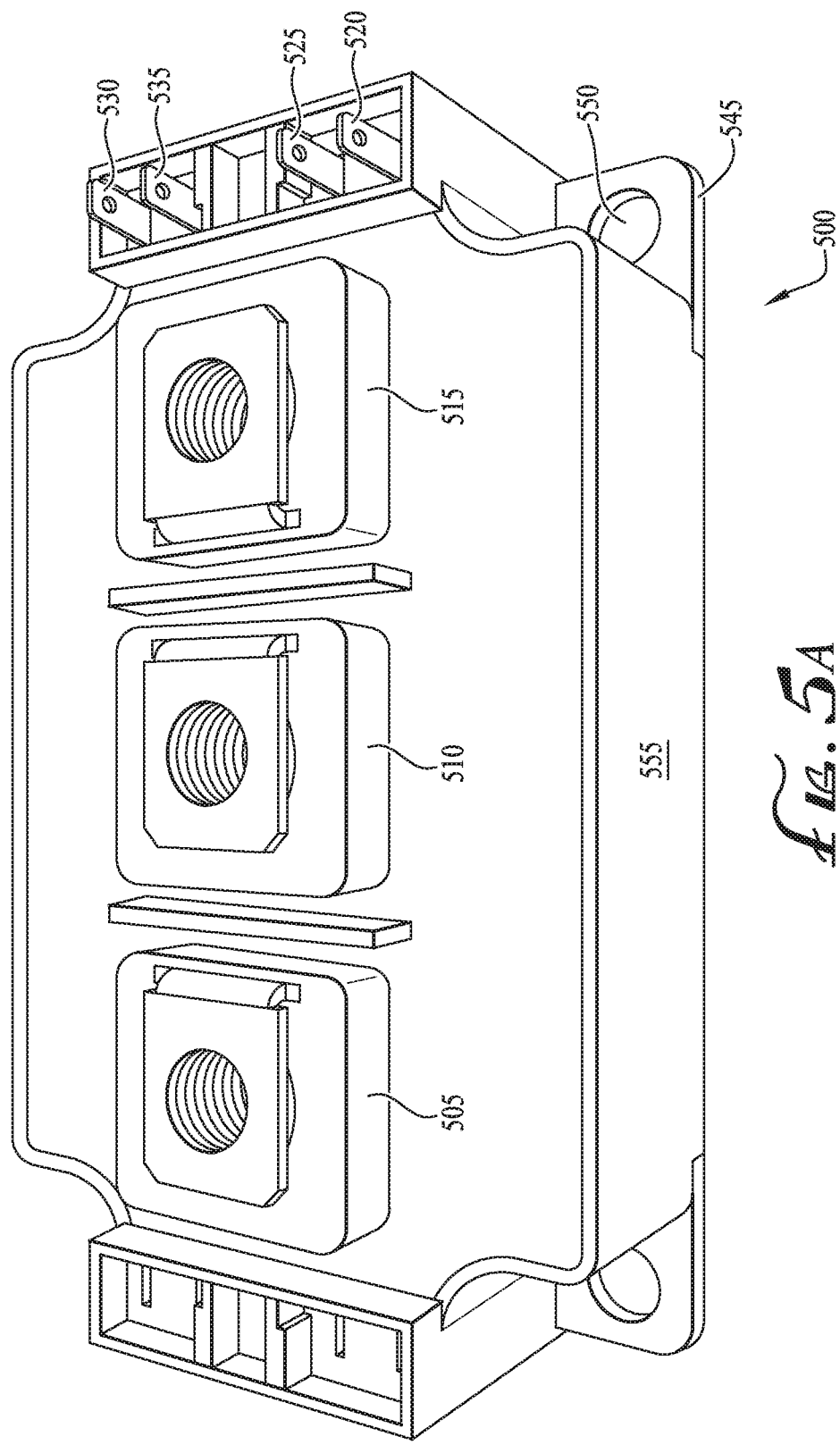
FIG. 5A is a perspective view of a VSD controller module containing two silicon carbide power semiconductor devices of an illustrative embodiment.

FIG. 5A illustrates a perspective view of a SiC power device module of an illustrative embodiment. One or more SiC power devices 125 maybe included in module 500. SiC power device 125 may be rated at between 100 and 600 amperes and employed in VSD controller 305 to operate ESP motor 320. SiC power device 125 may allow a VSD controller 305 with a smaller inductor footprint than conventional silicon power devices at the same power output, although footprint may vary by manufacturer. Illustrative embodiments of SiC power semiconductor device 125 may be obtained from the Wolfspeed division of Cree, Inc. of Durham, N.C., Semikron International Gmbh of Nuremberg, Germany or Powerex Inc. of Youngwood, Pa.

In some embodiments, SiC power device 125 may include a chip set of 3C, 4H and/or 6H silicon carbide polytype crystal structure wafers, and be cased in an industrial housing. In an exemplary embodiment, an all-SiC power device 125 may include a chipset containing 1200V, 1700V or higher voltage silicon carbide metal-oxide-semiconductor field-effect transistors (MOSFETs) and SiC diodes.

Figure 5B:
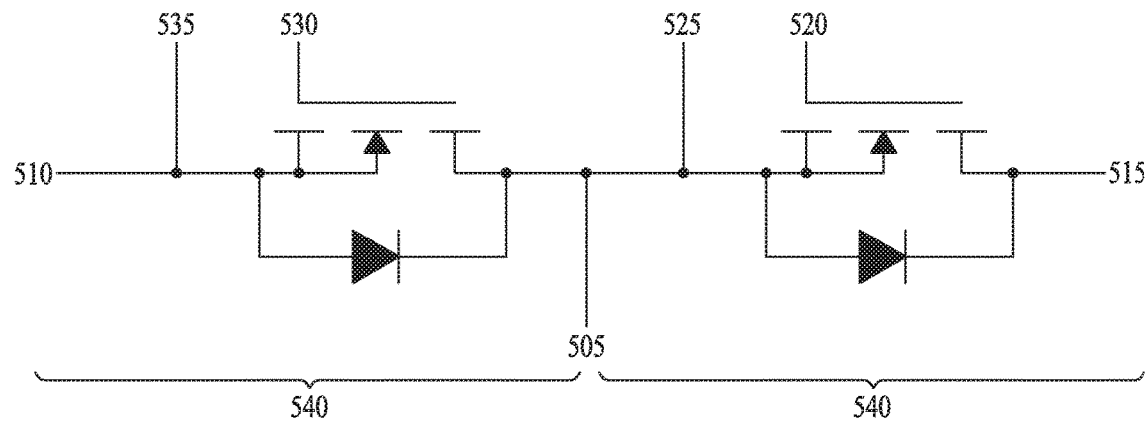
FIG. 5B is a schematic of a MOSFET type module of an illustrative embodiment.

FIG. 5B illustrates a SiC MOSFET embodiment of SiC power device 125 employing two SiC MOSFETs 540 per module 500. In the embodiment of FIG. 5B, module 500 includes a pair of two MOSFETs 540, arranged electrically one adjacent and/or above the other. First terminal 505 may be the drain of first MOSFET 240 and also the source of second MOSFET 240 of the pair of MOSFETs 240 in module 500 of illustrative embodiments. Second terminal 510 may be the source of second MOSFET 240 and third terminal 515 may be the drain of first MOSFET 240. First switch 520 may control voltage (on or off) of first MOSFET 240 and second switch 530 may control voltage (on or off) of second MOSFET 240. First feedback line 525 and second feedback line 535 may function as a feedback circuit for first and second MOSFET 240, respectively. Module 500 may include a single MOSFET 540, a pair of MOSFETs 540 or multiple pairs of MOSFETs 540.

Figure 5C:
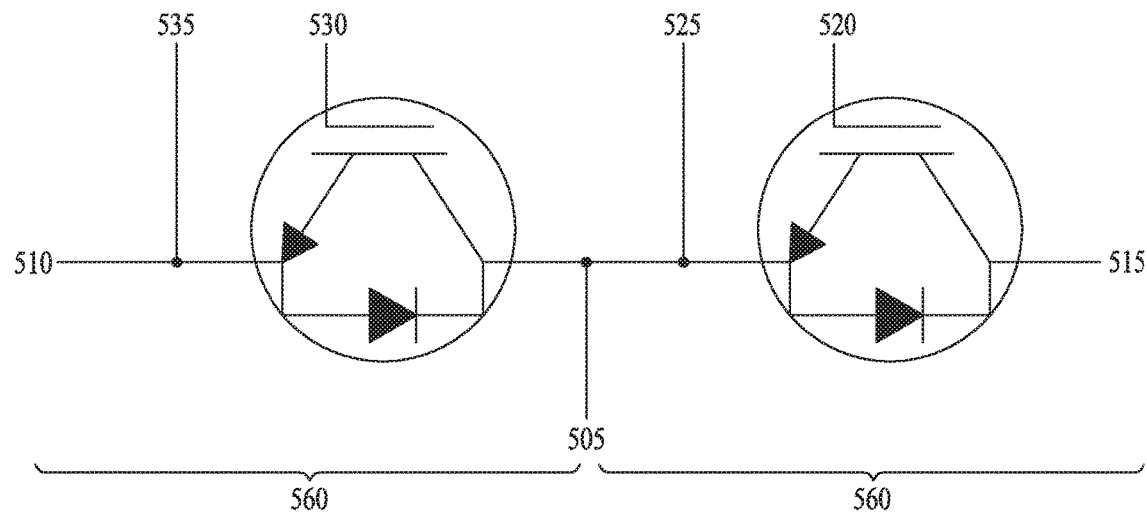
FIG. 5C is a schematic of an IGBT type module of an illustrative embodiment.

In some embodiments, SiC power device 125 may include insulated gate bipolar transistors (IGBT) and SiC diodes, rather than MOSFETs 240. FIG. 5C illustrates module 500 having IGBT type SiC power devices 125. Two IGBT devices 560 may be included in module 500, arranged electrically one adjacent and/or above the other. Terminals 505, 510, 515, switches 520, 530 and feedback lines 525, 535 may function similarly in IGBT devices 560 as in MOSFET 240 embodiments. Module 500 may include a single IGBT device 560, a pair of IGBT devices 560 or multiple pairs of IGBT devices 560.

As illustrated in FIGS. 5A-5C, module 500 includes two SiC power devices 125 in a pair, either two MOSFETs 240 or two IGBT devices 260. One or more SiC power devices 125 may be packaged in one module 500, such as two, three, six, eight, or more. Module 500 may include housing 555 and baseplate 545. Baseplate 545 may be copper or AlSiC, and the SiC semiconductors may be isolated from baseplate 545 with an insulator such as aluminum nitride or $Si_3N_4$. Baseplate may include openings 550 to allow baseplate to be mounted to a heat sink. One or more modules 500 may form inverter section 110 and/or AFE converter 205.

Figure 3:
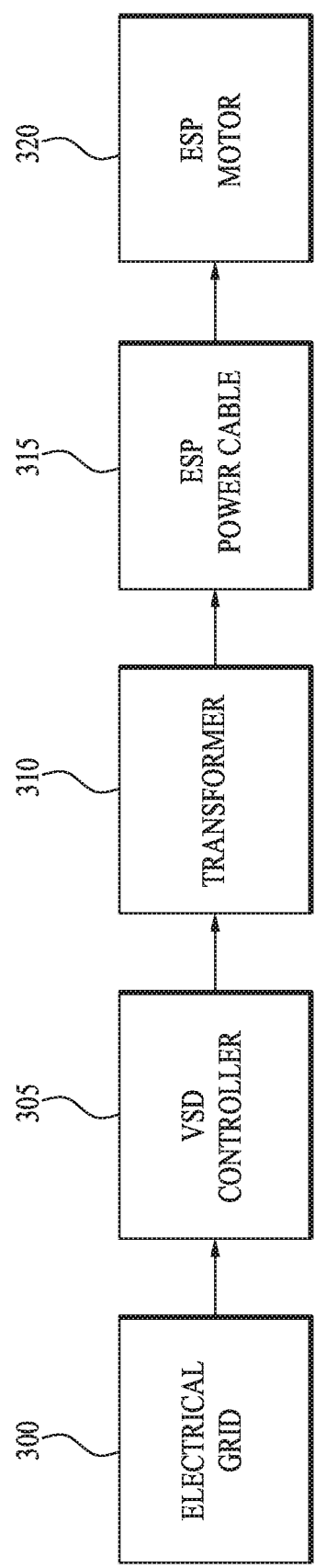
FIG. 3 is a schematic of an illustrative embodiment of a power and control system for an electric submersible pump (ESP) motor.

FIG. 3 is a schematic of an ESP VSD controller system of illustrative embodiments. As shown in FIG. 3, VSD controller 305 may obtain power from electrical grid 300. VSD controller 305 may include inverter section 110 and/or AFE converter section 205 employing one or more silicon carbide power devices 125, which power devices 125 may comprise silicon carbide semiconductor power modules including silicon carbide semiconductor chip sets such as SiC MOSFETs 240 and/or SiC IGBT devices 260. VSD 305 may connect to transformer 310. Transformer 310 may step up 480 volt VSD controller 305 output to the appropriate medium voltage of ESP motor 320 by selecting the correct taps on transformer 310. Transformer 310 may be slightly over designed to prevent saturation when operating in DC boost during startup of ESP motor 320. ESP power cable 315 may extend between transformer 310 at the surface of a well, and ESP motor 320 located downhole in the well. ESP power cable 315 may include three insulated copper conductors that are enclosed by a helically wrapped strip of galvanized steel armor. The galvanized steel armor strip may be between 20 and 34 mils thick, and ESP power cable 315 may weigh about 1.5 pounds per foot. A zinc coating may cover the surface of the galvanized steel armor. ESP power cable 315 may be between 4,000 and 12,000 feet in length depending on well depth and/or distance from VSD controller 305.

Figure 6:
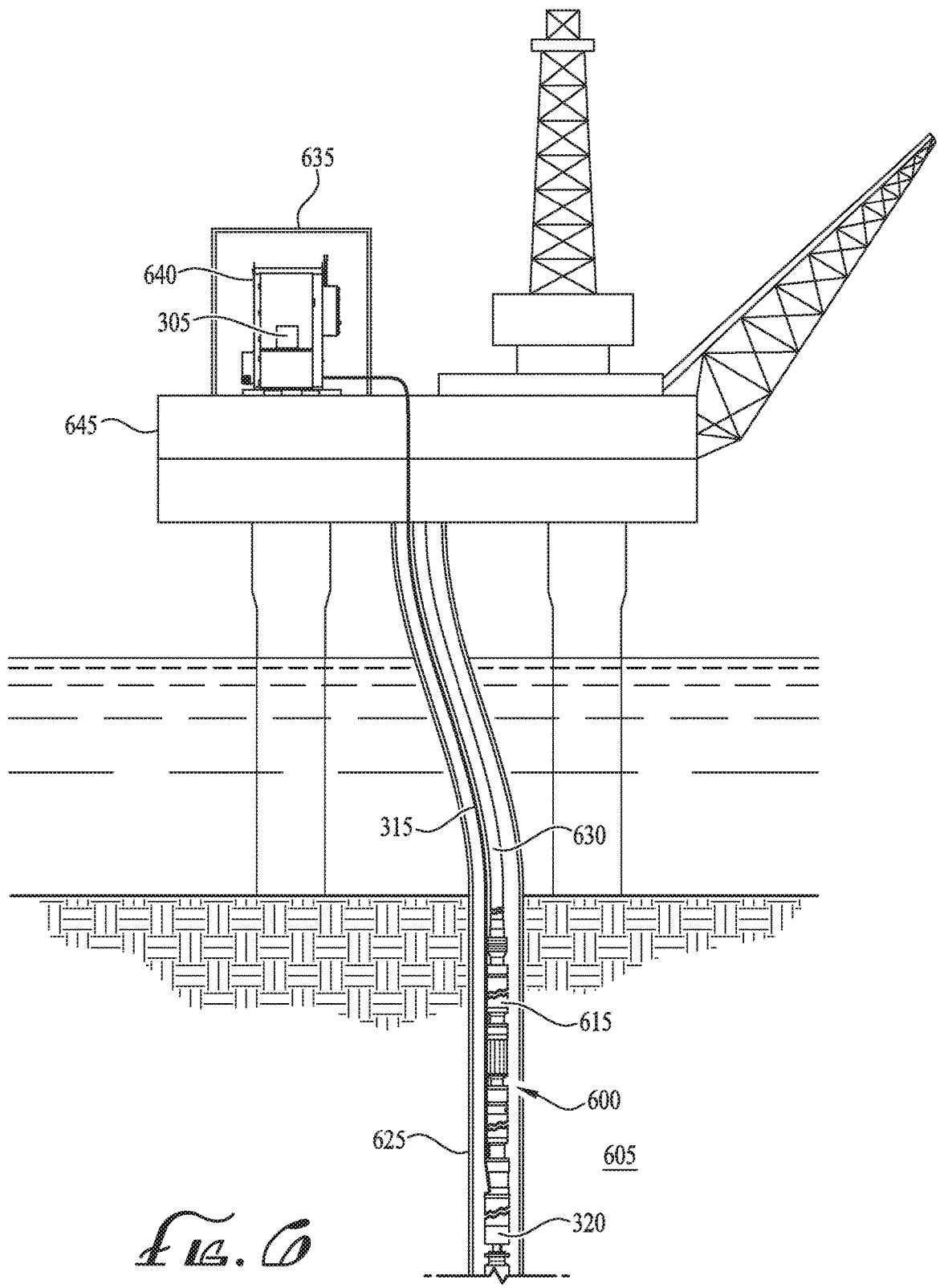
FIG. 6 is a perspective view of an offshore ESP assembly powered by a VSD controller of an illustrative embodiment.

FIG. 6 illustrates an ESP assembly of an illustrative embodiment. ESP assembly 600 may be placed downhole in a well, such as an oil well underground below the ocean. In offshore embodiments, VSD controller 305 may be placed in cabinet 640 inside control room 635 on offshore platform 645, such as an oil rig. Power cable 315 may extend from VSD controller 305 and/or transformer 310 to ESP motor 320 and plug and/or tape into ESP motor 320. ESP motor 320 may be towards the bottom of ESP assembly 600, just above downhole sensors deep within a well. Power cable 315 may be up to 12,000 feet in length. ESP motor 320 may be a two-pole, three-phase squirrel cage induction motor that operates to turn ESP pump 615. ESP pump 615 may be a multi-stage centrifugal pump including impeller and diffuser stages, which ESP pump 615 may lift fluid such as oil or other hydrocarbons through production tubing 630 to storage tanks onboard offshore platform 645. In some embodiments, pump 615 may be a horizontal surface pump, progressive cavity pump or an electric submersible progressive cavity pump. A motor seal section and intake section may extend between motor 320 and pump 615. Well casing 625 may separate ESP assembly 600 from well formation 305 and/or seawater. Perforations in casing 625 may allow fluid from formation 605 to enter casing 625 underground. VSD controller 305 may control and power ESP motor 320 to adjust the speed of motor 320 to match well productivity.

An ESP VSD controller has been described. Illustrative embodiments provide an improved power system for an ESP motor employed downhole. The SiC power device of illustrative embodiments may be a semiconductor power device made of silicon carbide and employed in a VSD inverter and/or VSD converter. The silicon carbide power device may replace the conventional silicon power devices employed in VSD inverters used in ESP applications. Illustrative embodiments may provide a VSD inverter with reduced switching losses, and a power output of 50 hp-3,000 hp with a smaller footprint, as compared to a silicon power device of conventional ESP power systems. The power system described herein may be employed in other types of pumps in addition to downhole ESP pumps, such as surface pumps, progressive cavity pumps and/or electric submersible progressive cavity pumps.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A variable speed drive (VSD) control system comprising:
    a pump assembly comprising an induction motor operatively coupled to a pump;
    a power cable, a pulse width modulated (PWM) filter, and a transformer electrically coupled between the induction motor and a VSD controller, the PWM filter conditioning voltage sent to the transformer; and
    the VSD controller controlling a speed of the induction motor, the VSD controller comprising:
        a converter section that sends a direct current;
        a DC link comprising a DC smoothing capacitor that smooths the direct current; and
        an inverter active switch section that converts the smoothed direct current to a PWM output voltage, the inverter active switch section comprising one of at least one silicon carbide (SiC) metal-oxide-semiconductor field-effect transistor (MOSFET) or at least one SiC insulated-gate bipolar transistor (IGBT) device.

2. The VSD control system of claim 1, wherein the inverter active switch section comprises the at least one SiC IGBT device, the at least one SiC IGBT device further comprising:
    a first SiC IGBT device electrically connected to a second SiC IGBT device by a terminal; and
    the terminal serving as a drain of the first SiC IGBT device and a source of the second IGBT device.

3. The VSD control system of claim 1, wherein the inverter active switch section comprises the at least one SiC MOSFET, the at least one SiC MOSFET further comprising:
    a first SiC MOSFET electrically connected to a second SiC MOSFET by a terminal; and
    the terminal serving as a drain of the first SiC MOSFET and a source of the second SiC MOSFET.

4. The VSD control system of claim 1, wherein the pump is a horizontal surface pump.

5. The VSD control system of claim 1, wherein the PWM filter filters the PWM output voltage to produce near sinusoidal voltages, the PWM filter comprising a plurality of inductors.

6. The VSD control system of claim 1, wherein PWM filter conditions the PWM output voltage to produce near sinusoidal voltages.

7. The VSD control system of claim 1, wherein the converter section comprises a three-phase, six-pulse, full-wave diode bridge.

8. The VSD control system of claim 1, wherein the one of the at least one SiC MOSFET or the at least one SiC IGBT device forms at least one SiC power semiconductor module.

9. The VSD control system of claim 8, wherein each of the at least one SiC power semiconductor modules is packaged in a housing and comprises a heat sink baseplate.

10. The VSD control system of claim 1, wherein the VSD controller comprises an LCL input filter and the converter section comprises an active front end, the active front end comprising at least one SiC power semiconductor module.

11. A variable speed drive (VSD) control system comprising:
    a pump assembly comprising an induction motor operatively coupled to a pump;
    a power cable, a pulse width modulated (PWM) filter, and a transformer electrically coupled between the induction motor and a VSD controller, the PWM filter conditioning voltage sent to the transformer; and
    the VSD controller controlling a speed of the induction motor, the VSD controller comprising:
        a converter section that sends a direct current;
        a DC link comprising a DC smoothing capacitor that smooths the direct current; and
        an inverter active switch section that converts the smoothed direct current to a pulse width modulated (PWM) output voltage, the inverter active switch section comprising at least one silicon carbide (SiC) power semiconductor module.

12. The VSD control system of claim 11, wherein each of the at least one SiC power semiconductor modules comprises at least one SiC metal-oxide-semiconductor field-effect transistor (MOSFET).

13. The VSD control system of claim 11, wherein PWM filter filters the PWM output voltage to produce near sinusoidal voltages, the PWM filter comprising a plurality of inductors.

14. The VSD control system of claim 11, wherein each of the at least one SiC power semiconductor modules comprises at least one SiC insulated-gate bipolar transistor (IGBT) device.

15. The VSD control system of claim 11, wherein the converter section comprises a plurality of second SiC power semiconductor modules, each of the plurality of second SiC power semiconductor modules comprising at least one pair of SiC MOSFETs.

16. The VSD control system of claim 11, wherein the converter section comprises a plurality of second SiC power semiconductor modules, each of the plurality of second SiC power semiconductor modules comprising at least one a pair of SiC IGBT devices.

17. The VSD control system of claim 11, wherein the pump is a multi-stage centrifugal surface pump.

* * * * *